T. E. MARABLE.
Plow Colter.

No. 81,187. Patented Aug. 18, 1868.

UNITED STATES PATENT OFFICE.

T. E. MARABLE, OF PETERSBURG, VIRGINIA, ASSIGNOR TO HIMSELF AND S. A. PLUMMER, OF SAME PLACE.

IMPROVEMENT IN CUTTER ATTACHMENTS FOR PLOWS.

Specification forming part of Letters Patent No. 81,187, dated August 18, 1868.

*To all whom it may concern:*

Be it known that I, T. E. MARABLE, of Petersburg, in the county of Dinwiddie and State of Virginia, have invented a new and Improved Cutter Attachment to Plows; and I do hereby declare that the following is a full, clear, and exact description of the construction and operation of the same, reference being had to the accompanying drawings, making a part of this specification, in which—

Figure 1:
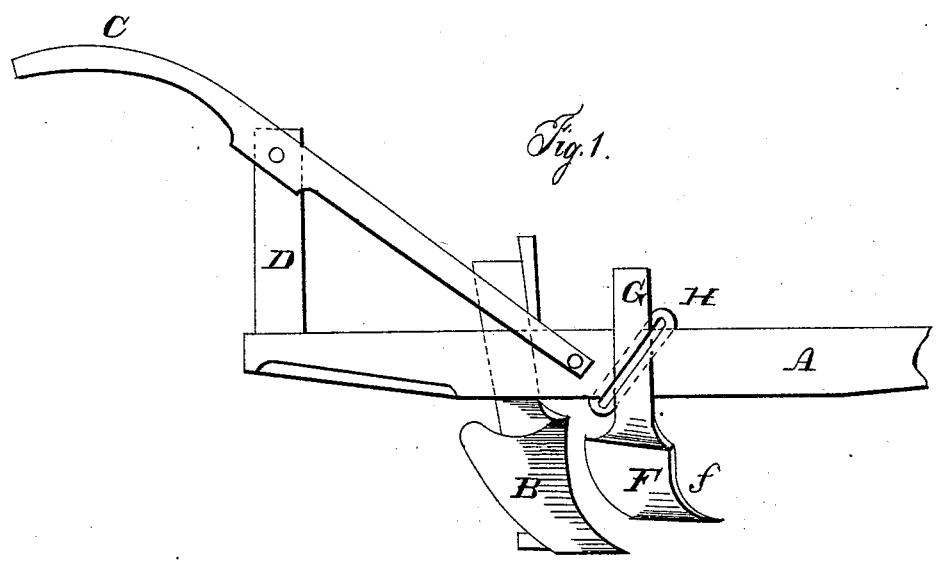
Figure 2:
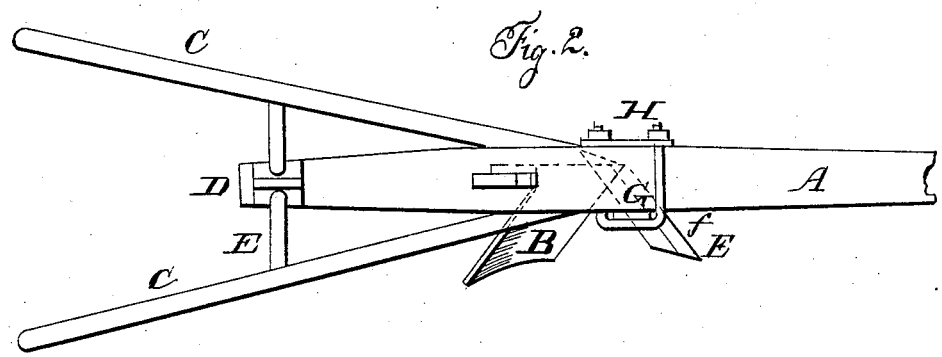

Figure 1 is a side elevation, showing the cutter attached. Fig. 2 is a top view of the same.

This device is a neat, simple, and cheap cutter, which can be readily attached to the beam of any plow, in front of the colter, mold-board, or shovel, and which will graze along the surface of the ground in advance of the plow, cutting up all weeds, grass, &c., and throwing them out of the way on the side opposite to that on which the plow throws its dirt.

In the drawings, A represents the plow-beam; B, the plow; C C, the plow-handles; D, a standard which supports the handles, and E a brace or round which connects the handles.

F represents the cutter, being formed with a short shank, G, by which it is attached to the plow-beam, being held in position at the side of the beam by means of a box-strap, H. The blade of the cutter F is so formed that when in position it presents a sharp cutting-edge, in an inclined position across the track of the plow. This edge is presented to the grass, weeds, &c., in the way of the plow, and severs them as the plow advances, while the inclined position of the cutter forces them out of the way, discharging them on that side of the plow opposite to the mold-board B, the inclination of the cutter being exactly the reverse of that of the mold-board. The cutting-edge (the lower edge of the cutter) is bent forward, so as to cut the weeds more easily, the body of the cutter curving back from the edge, and then up toward the shank G, in which it terminates. The cutter is so adjusted that while the mold-board runs under ground the edge of the cutter grazes the surface. It may be set up or down to any desired extent, so as to adjust it to the required depth of furrow. The form of the cutter-blade and its position are such that its edge scrapes the whole width of the furrow which is to be cut by the plow behind it.

It will be observed that by confining this attachment to the plow-beam by means of the box-strap H, as described, the plow-beam is not cut away, slotted, or weakened in the least. The same feature enables the device to be as readily attached to one kind of plow as another and to be adjusted at any point along the beam, while the cutter can be adjusted up or down as readily.

Having thus described my invention, what I claim as new, and desire to secure by Letters Patent, is—

1. The cutter F, when constructed and arranged in connection with a plow, so as to scrape the surface of the ground in front of the mold-board and the whole width of the furrow, cutting the weeds, grass, &c., therefrom and casting them out of the way of the plow on the side opposite to the mold-board.

2. The combination of the plow B, beam A, cutter F, shank G, and box-strap H, substantially as described.

T. E. MARABLE.

Witnesses:
   G. F. MARKS,
   JAMES DOHERTY.